United States Patent
Wu

[19]

[11] Patent Number: 6,036,336
[45] Date of Patent: Mar. 14, 2000

[54] LIGHT EMITTING DIODE RETROFITTING LAMPS FOR ILLUMINATED TRAFFIC SIGNS

[76] Inventor: Chen H. Wu, 23305 Eastbrook Ave., Los Altos Hills, Calif. 94024

[21] Appl. No.: 09/075,492

[22] Filed: May 8, 1998

[51] Int. Cl.[7] ................................................. F21V 21/00
[52] U.S. Cl. .......................... 362/249; 362/226; 362/250; 362/269; 362/800; 362/812; 40/544; 40/550
[58] Field of Search .................................... 362/226, 227, 362/249, 250, 238, 269, 800, 812, 287, 288; 40/544, 550

[56] References Cited

U.S. PATENT DOCUMENTS

| | | | |
|---|---|---|---|
| 4,298,869 | 11/1981 | Okuno | 340/792 |
| 4,682,147 | 7/1987 | Bowman | 340/286 R |
| 4,887,074 | 12/1989 | Simon et al. | 340/782 |
| 5,040,320 | 8/1991 | Reidinger | 40/570 |
| 5,388,357 | 2/1995 | Malita | 40/570 |
| 5,410,453 | 4/1995 | Ruskouski . | |
| 5,416,679 | 5/1995 | Ruskouski et al. | 362/240 |
| 5,428,912 | 7/1995 | Grondal et al. | 40/570 |
| 5,459,955 | 10/1995 | Ruskouski et al. | 40/570 |
| 5,463,280 | 10/1995 | Johnson | 315/187 |
| 5,526,236 | 6/1996 | Burnes et al. . | |
| 5,561,346 | 10/1996 | Byrne | 313/512 |
| 5,655,830 | 8/1997 | Ruskouski . | |
| 5,688,042 | 11/1997 | Madadi et al. . | |
| 5,726,535 | 3/1998 | Yan . | |
| 5,729,925 | 3/1998 | Prothero . | |
| 5,806,965 | 9/1998 | Deese | 362/249 |
| 5,890,794 | 4/1999 | Abtahi et al. | 362/294 |

OTHER PUBLICATIONS

Leotek Lamps, Leotek Electronics Corporation product information sheet, 2 pages, Pub. Aug. 1996.
Leotek Open Signs, Leotek Electronics Corporation product information sheet, 2 pages, Pub. 1996.
Astralite 2000, Astralite product information sheet, 2 pages, Pub.1994.
T6.5 Ultra Life, Halco Lighting Corporation product information sheet, 1 page, Pub. 1995.
Redhead LED Exit Lamp, TCP product information sheet, 1 page, Pub. Nov., 1995.
E–Z Lamp, Isolite Corp. product information sheet, 2 pages, Pub. 1995.
Exbrite Exit Retrofit, Conservalite Technologies, Inc. product information sheet, 1 page, Pub. Apr. 5, 1996.
Bright Idea, Standard Enterprises Inc. product information sheet, 2 pages, Pub. Mar. 1, 1996.
Universal T Lamp, Area Lighting Research, Inc. product information sheet, 2 pages, Pub. Apr., 1996.
Wattman LED Exit Retrofit Lamp, Standard Enterprises Inc. product information sheet, 2 pages, Pub. 1995.

*Primary Examiner*—Sandra O'Shea
*Assistant Examiner*—John Anthony Ward
*Attorney, Agent, or Firm*—Limbach & Limbach L.L.P.

[57] ABSTRACT

A light emitting diode (LED) retrofit lamp with locking swivel mount that mounts into a threaded screw-in electrical socket of a traffic signal. The LED lamp includes a socket housing, a printed circuit board and a plurality of light emitting diodes. The socket housing has a lower end terminating in a threaded base for insertion into a threaded screw-in electrical socket. The printed circuit board is rotatably mounted to the socket housing. The plurality of light emitting diodes is mounted on the printed circuit in such a manner that they form a symbol image, such as an arrow, a pedestrian walking, a hand, a letter or even words. The printed circuit board is rotatable relative to the socket housing for rotation of the symbol image formed by the light emitting diodes to a desired rotational orientation relative to the socket housing. Therefore, once the threaded base is fully inserted into the threaded screw-in electrical socket of a traffic signal, the printed circuit board can be rotated relative to the socket housing so that the symbol image is properly oriented.

20 Claims, 7 Drawing Sheets

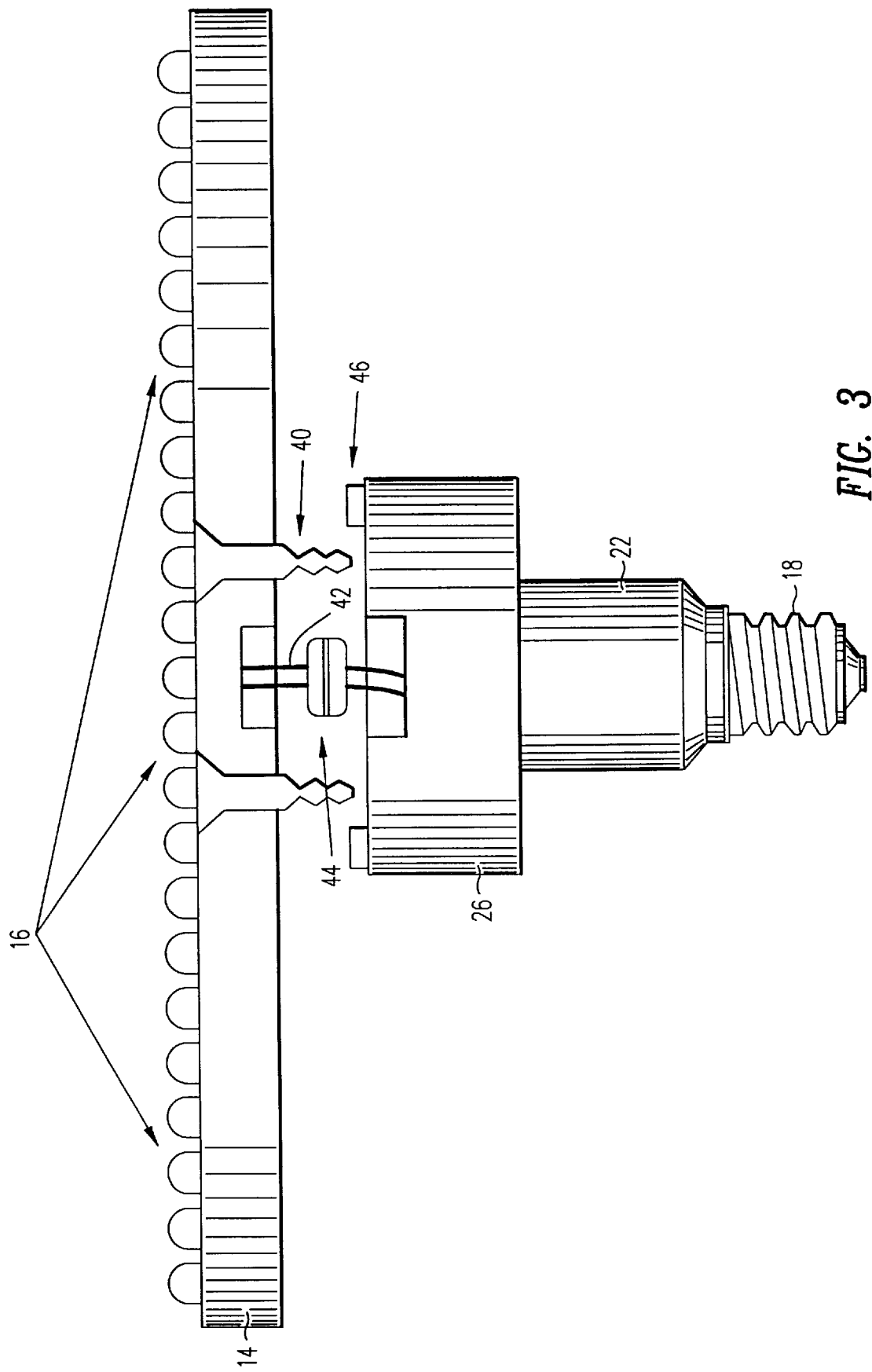

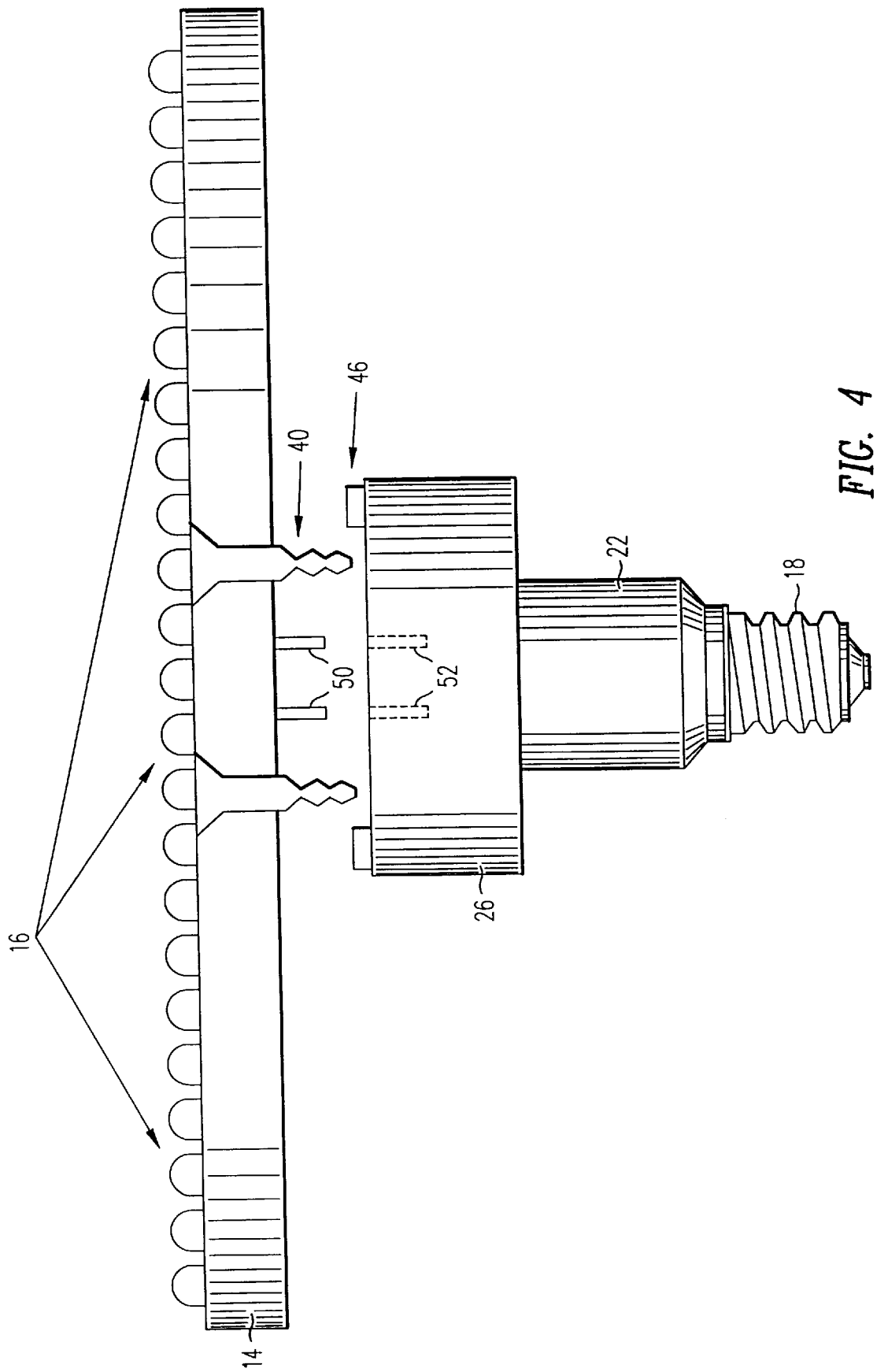

LIGHT EMITTING DIODE RETROFITTING LAMPS FOR ILLUMINATED TRAFFIC SIGNS

FIELD OF THE INVENTION

The present invention relates to lamps, and more particularly to light emitting diode (LED) lamps for illuminated traffic signals.

BACKGROUND OF THE INVENTION

Most traffic signals are illuminated by incandescent lamps that are threaded into standard electrical screw-in lamp sockets. The lamps have colored and/or masked lenses over them to indicate to drivers and pedestrians when they can enter the intersection. The masked lenses form symbols such as an arrow, a hand, a person walking, letters or even words by blocking light from passing through selected portions of the lenses.

Conventional illuminated traffic signals have several drawbacks. The standard incandescent lamps used therein have relatively short life spans. Further, such lamps consume significant amounts of energy. These problems are of special concern because most traffic signals operate continuously. Another drawback with conventional traffic signals is that the masked lenses used to create the illuminated symbol images waste energy because they block light produced by the lamp in order to form the images. Therefore, a significant amount of light from the lamps is wasted as heat absorbed by the lenses instead of light being projected out to the traffic.

There is a need for a traffic signal lamp that has a longer lifetime and uses less energy than conventional traffic signal lamps. Further, there is a need for such a lamp to form the necessary illuminated symbol images without having to use masked lenses that are expensive and waste energy. Lastly, there is a need for such a lamp to be compatible with the standard screw-in electrical lamp socket so that existing traffic signals can be retrofitted with the new lamp.

SUMMARY OF THE INVENTION

The present invention solves the aforementioned problems by providing a light emitting diode retrofit lamp with a locking swivel mount that has a longer lifetime and uses less energy than a conventional lamp, and screws into a standard screw-in lamp socket while providing for the proper rotational orientation of the lamp. Further, the LED retrofit lamp can be shaped to form illuminated symbols that can be used alone, or with existing or new masked lenses for improved contrast.

The light emitting diode retrofit lamp, for mounting in a threaded screw-in electrical socket of a traffic signal, includes a socket housing, a printed circuit board and a plurality of light emitting diodes. The socket housing has a lower end terminating in a threaded base for insertion into a threaded screw-in electrical socket. The printed circuit board is rotatably mounted to the socket housing. The plurality of light emitting diodes is mounted on the printed circuit in such a manner that the plurality of light emitting diodes form a symbol image. The printed circuit board is rotatable relative to the socket housing for rotation of the symbol image formed by the light emitting diodes to a desired rotational orientation relative to the socket housing.

In another aspect of the present invention, an LED lamp for mounting in a threaded screw-in electrical socket of a traffic signal includes a socket housing, a printed circuit board and a plurality of light emitting diodes. The socket housing has a lower end terminating in a threaded base for insertion into a threaded screw-in electrical socket. The printed circuit board is rotatably mounted to the socket housing. The plurality of light emitting diodes are mounted on the printed circuit in such a manner that at least some of the diodes are oriented at an oblique angle to the printed circuit board.

Other objects and features of the present invention will become apparent by a review of the specification, claims and appended figures.

BRIEF DESCRIPTION OF THE DRAWINGS

FIG. 3 is a side view of an alternate embodiment of the socket assembly for the LED lamp of the present invention.

FIG. 4 is a side view of a second alternate embodiment of the socket assembly for the LED lamp of the present invention.

DETAILED DESCRIPTION OF THE PREFERRED EMBODIMENTS

Figure 1A:
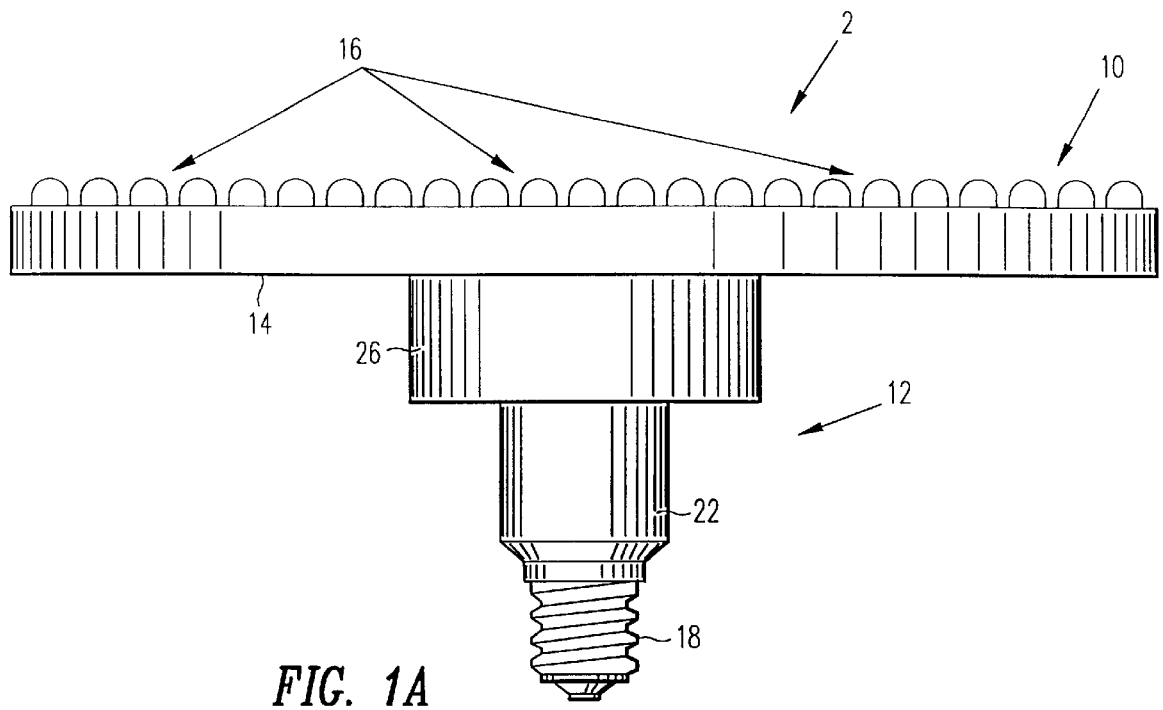
FIG. 1A is a side view of a LED lamp of the present invention.
Figure 1B:
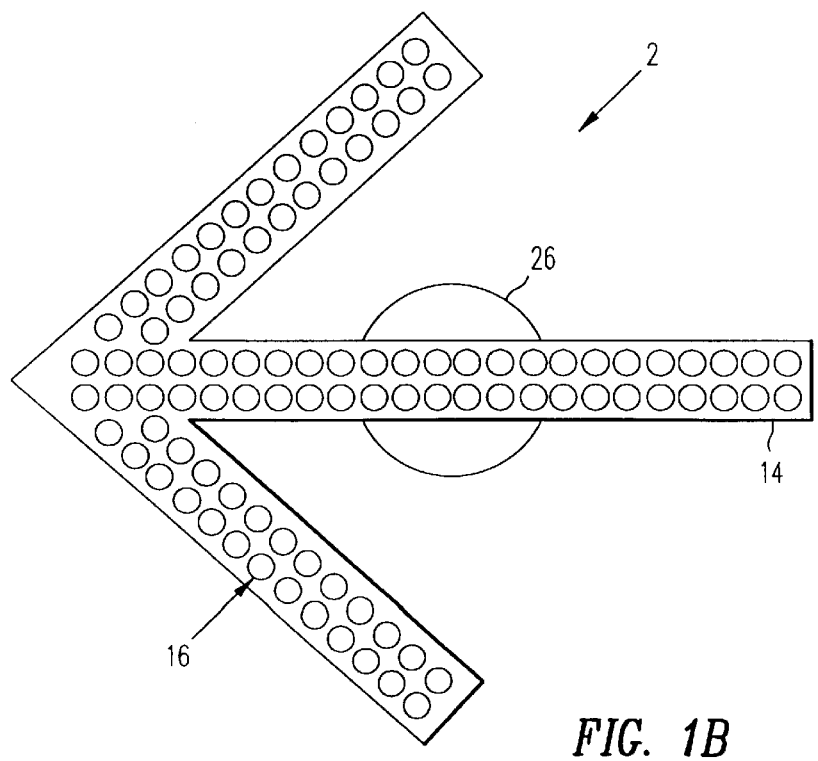
FIG. 1B is a top view of the LED lamp of the present invention.
Figure 1C:
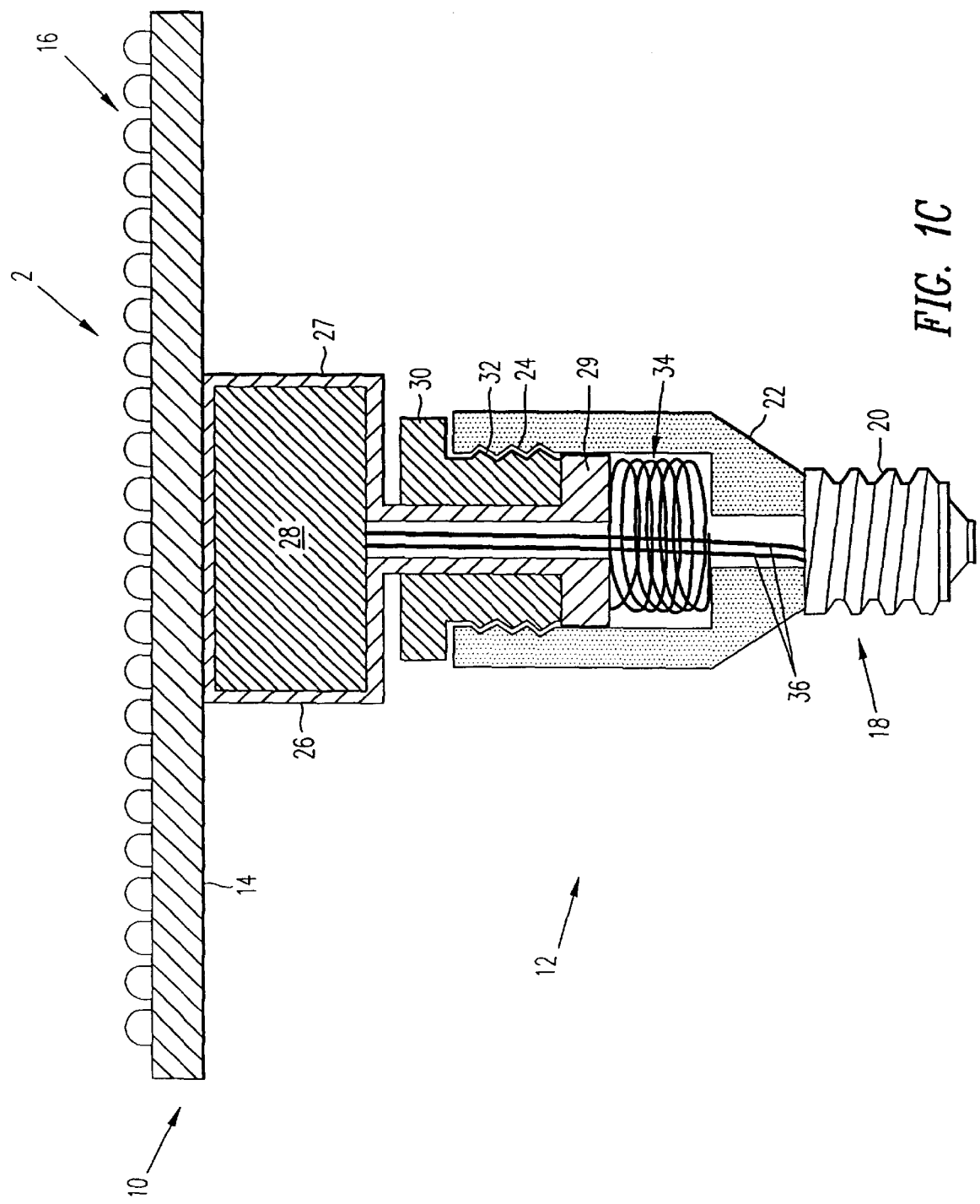
FIG. 1C is a side cross-sectional view of the LED lamp of the present invention.

The present invention is an light emitting diode (LED) lamp that directly inserts into conventional screw-in lamp sockets of existing traffic signals. The LED lamp 2 of the present invention is illustrated in FIGS. 1A, 1B and 1C, and includes a lamp body 10 and locking swivel mount 12.

The lamp body 10 includes a printed circuit (PC) board 14 and a plurality of light emitting diodes (LEDs) 16 mounted to the PC board 14. The PC board illustrated in FIGS. 1A–C is formed in the shape of an arrow. Thus, the LEDs 16 mounted on the arrow shaped PC board 14 form an illuminated arrow symbol that is ideal for traffic signals, such as for left/right hand turn lanes, go-forward lanes, etc.

Locking swivel mount 12 includes a threaded base 18, a hollow socket housing 22, a circuit housing 26, a retainer 30, a spring 34 and wires 36. The threaded base includes external threads 20 that engage a standard screw-in electrical lamp socket. The hollow socket housing 22 has the threaded base 18 at its lower end and internal threads 24 at its upper end. The circuit housing 26 has an upper portion 27 that houses circuitry 28 for operating the LEDs 16, and a lower portion 29 that is rotatably engaged with retainer 30. Circuitry 28 used to operate LEDs by rectifying and/or lowering the incoming line voltage is standard in the industry and will not be further discussed herein. The retainer 30 has external threads 32 that engage the internal threads 24 of socket housing 22. Once the external threads 32 of retainer 30 have fully engaged the internal threads 24 of socket housing 22, then the circuit housing 26 is rotatable relative to the socket housing 22 via lower portion 29 and retainer 30. The spring 34 biases against socket housing 22 and lower portion 29 of circuit housing 26, whereby friction induced by the spring bias between lower portion 29 and retainer 30 limits the rotation therebetween for selective positioning of the circuit housing 26 as described below. Wires 36 electrically connect circuitry 28 to the threaded base 18. It should be noted that there are alternate ways of affixing the retainer 30 to the socket housing 22 than the use of threads, such as with screws, etc.

The locking swivel mount 12 allows the circuit housing 26 (and therefore the PC board 14) to rotate once the threaded base 18 fully engages the traffic signal screw-in lamp socket. Such rotation is necessary so that the orientation of the arrow formed by the LEDs 16 can be set in the proper direction after the lamp 2 is installed in the traffic signal socket. After base 18 is fully threaded into a traffic signal socket, circuit housing 26 is rotated relative to socket housing 22 via lower portion 29 and retainer 30. Once the proper orientation of the PC board 14 is achieved, spring 34 provides sufficient friction between lower portion 29 and retainer 30 to prevent further rotation therebetween so the PC board 14 stays properly aligned.

The LEDs 16 provide bright illumination with less energy than a conventional lamp. A majority of the light emanating from an LED is generally projected in the direction in which the LED output end is pointing (facing). Therefore, the LED lamp 2 directs most of its light in the direction it faces for improved illumination to its intended viewers, which minimizes the amount of light that is wasted as stray light directed away from the area of interest (such as to adjacent lanes of traffic, etc.). Further, since the LEDs are arranged in the shape of an arrow, use with a masked lens provides superior contrast. Alternately, it may be possible to use the arrow shaped LEDs without a masked lens.

Figure 2A:
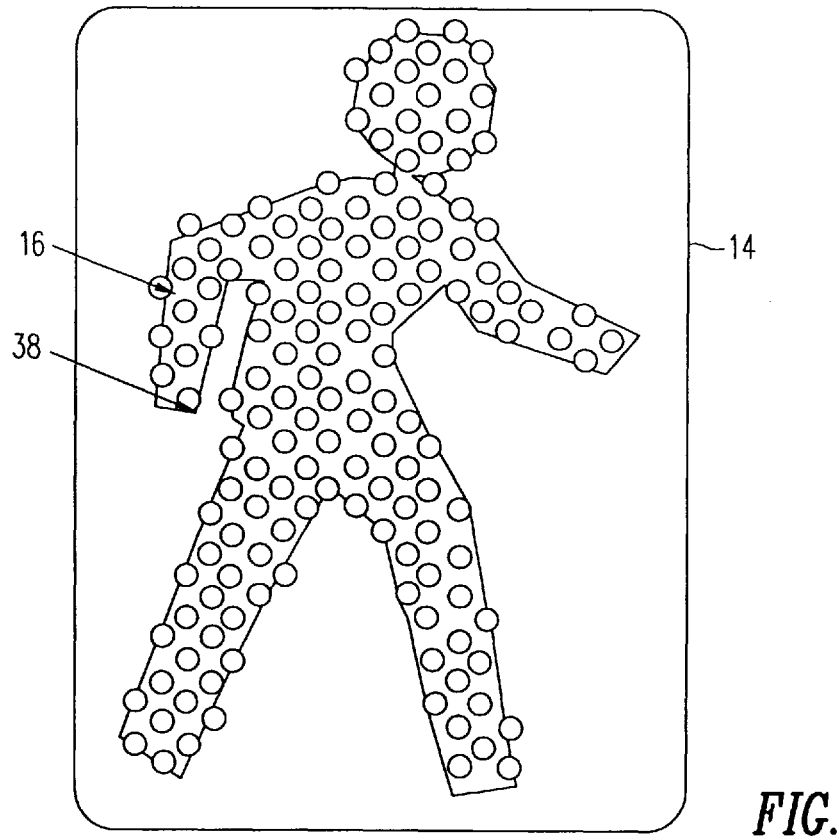
FIG. 2A is a top view of the LED lamp of the present invention forming an image of a pedestrian.
Figure 2B:
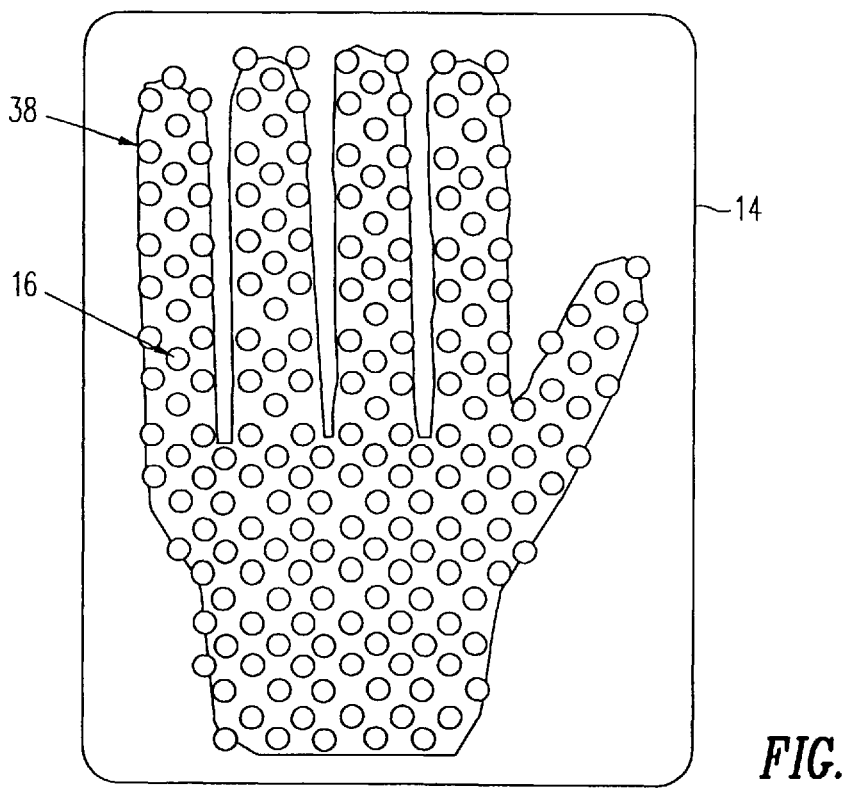
FIG. 2B is a top view of the LED lamp of the present invention forming an image of a hand.

While the shape of the PC board 14 in FIGS. 1A–C is similar to the shape of the illuminated symbol image produced by the LEDs 16 (an arrow), the PC board 14 can have any shape, so long as the LEDs 16 are arranged to form the desired symbol image. For example, FIGS. 2A and 2B illustrate a rectangular shaped PC board 14, with LEDs 16 arranged to form an image of a walking pedestrian (FIG. 2A) or a hand (FIG. 2B). A trace 38 of the desired image is formed on the PC board 14, and LEDs 16 are mounted to fill the traced image. This arrangement of LEDs 16 prevents irradiation of large portions of the mask lens that are opaque, thus maximizing efficiency.

One problem with the rectangular shaped PC board 14 illustrated in FIGS. 2A–B is that the PC board 14 cannot be rotated inside a typical rectangular shaped pedestrian walk sign housing that is only slightly larger than the rectangular shaped PC board 14. FIG. 3 illustrates a modification to the locking swivel mount 12 to make it ideal for mounting into a screw-in socket without rotation of the PC board. PC board 14 is removably mounted to the circuit housing 26, such as with screws 40. Wires 42, with a removable electrical connection 44, connect the LEDs to circuitry 28. Once the threaded base 18 is fully engaged in the traffic signal socket, and the circuit housing 26 is rotated to its proper position relative to the socket housing 22, then the wires 42 are connected with electrical connector 44 and PC board 14 is mounted to circuit housing 26 with screws 40. An annular seal 46 between circuit housing 26 and PC board 14 prevents water from entering circuit housing 26.

The LEDs 16 themselves can be of different colors, and/or have a colored filter placed thereover. It should be evident from the above description that the retrofit lamps of the present invention are also ideal for newly manufactured traffic signals.

FIG. 4 illustrates an alternate way of removably mounting PC board 14 to housing 26 so that PC board 14 need not be rotated while threaded base 18 is screwed into the electrical socket of the traffic signal. Plugs 50 are added that are electrically connected to LEDs 16. Sockets 52 are formed in circuit housing 26 and are electrically connected to circuitry 28. Once the threaded base 18 is fully engaged in the traffic signal socket, and the circuit housing 26 is rotated to its proper position relative to the socket housing 22, then plugs 50 are inserted into sockets 52. Plugs 50 engaged in sockets 52 electrically connect LEDs 16 to circuitry 28 while screws 40 secure PC board 14 to circuit housing 26.

Figure 5A:
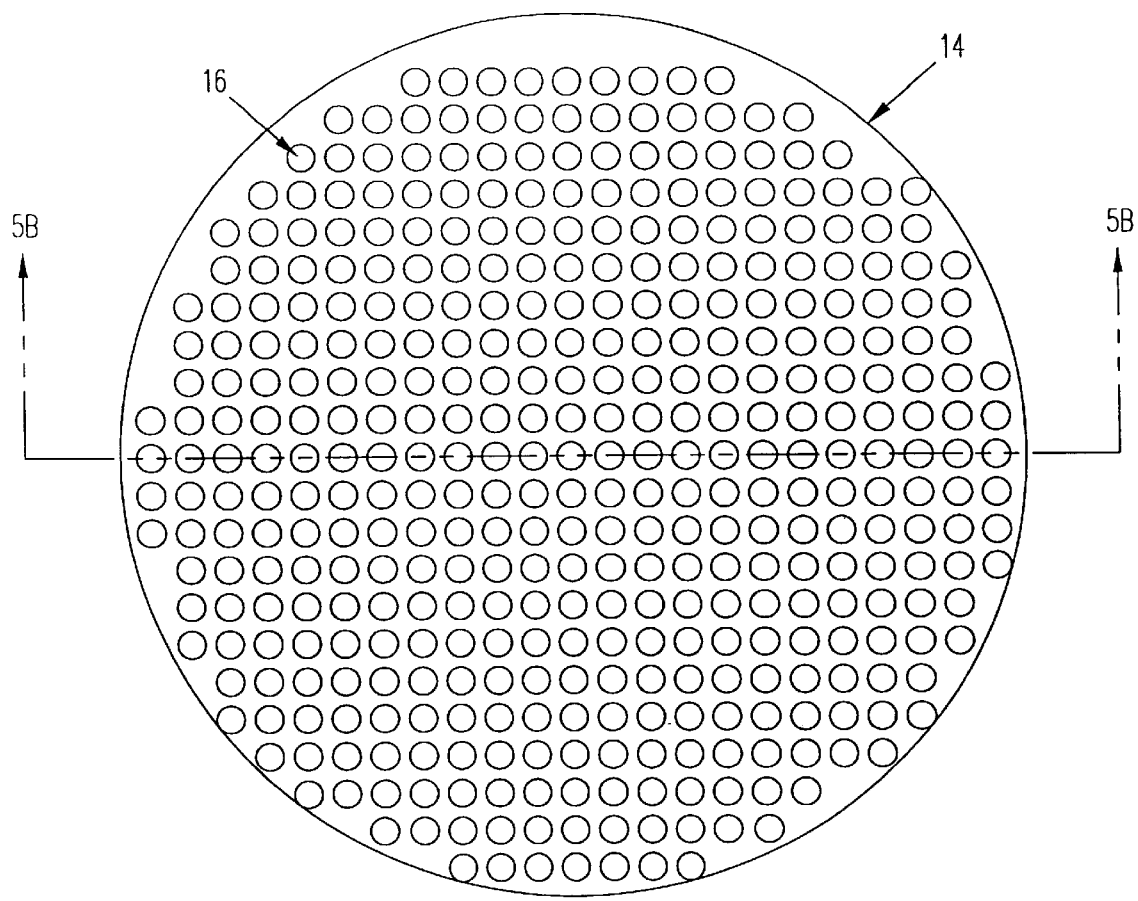
FIG. 5A is a top view of another embodiment of present invention with the LED's oriented to one side.
Figure 5B:
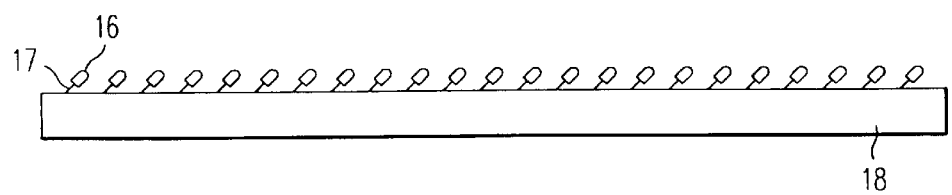
FIG. 5B is a side cross-sectional view of the embodiment of FIG. 5A.

FIGS. 5A and 5B illustrate another embodiment of the present invention, which exploits the directionality of the LED's output. As stated above, the majority of the light emanating from an LED is generally projected in the direction in which the LED output end is pointing (facing). The LEDs 16 are mounted onto the PC board 14 so that they are raised from its front surface. This allows the leads 17 of the LEDs 16 to be bent to individually adjust the orientation of the LEDs, and therefore adjust the directionality of the lamp output so that they are oriented at an oblique (non-normal) angle to the PC board 14. For example, all of the LED's of the round lamp 2 of FIGS. 5A/B can be directed to one side, which is ideal for traffic signals that have adjacent lanes of traffic close together, or where the traffic lane of interest is at an angle to the lamp 2. Alternately, some LED's can be oriented in one direction and other LED's oriented in another direction, which is ideal for a lamp used to direct traffic in more than one traffic lane.

Figure 6:
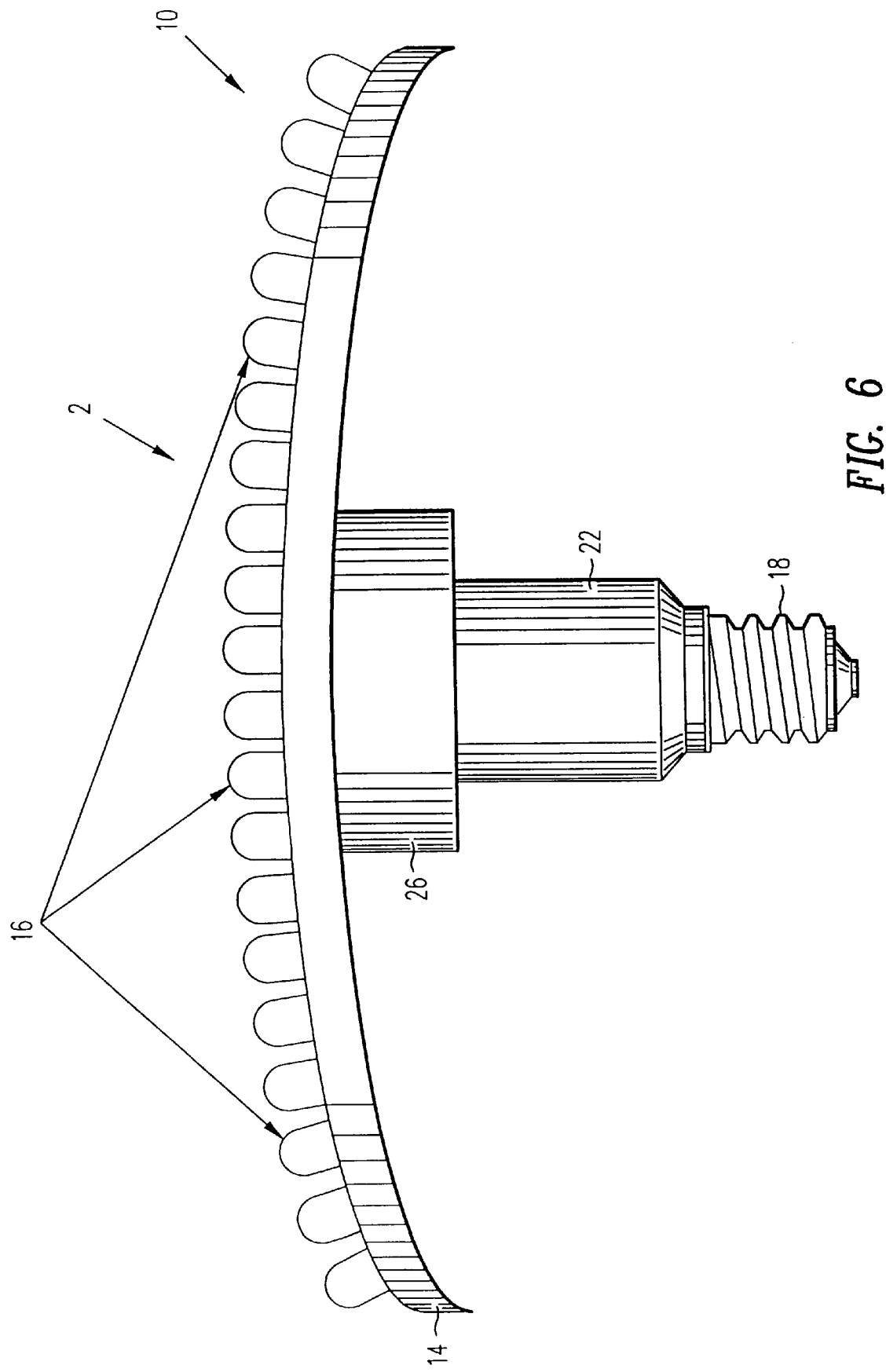
FIG. 6 is a side view of still another embodiment of the present invention where the LED lamp is curved.

It is to be understood that the present invention is not limited to the embodiments described above and illustrated herein, but encompasses any and all variations falling within the scope of the appended claims. For example, images other than a pedestrian, hand or arrow can be formed by the LEDs, including spelled out words such as "DON'T", "WALK", "GO", "STOP", etc. Further, the density of the LED's on the PC board can be varied to give varying illumination. Plugs 50 can instead be attached to the circuit housing 26 and the sockets 52 can be formed in the printed circuit board 14. Lastly, the PC board 14 can be curved (non-planar), as illustrated in FIG. 6, to better match curved masked lenses.

What is claimed is:

1. An LED lamp for mounting in a threaded screw-in electrical socket of a traffic signal, comprising:

a socket housing having a lower end terminating in a threaded base for insertion into a threaded screw-in electrical socket;

a printed circuit board rotatably mounted to the socket housing; and a plurality of light emitting diodes mounted on the printed circuit in such a manner that the plurality of light emitting diodes form a non-symmetric symbol image, wherein the printed circuit board is selectively rotatable relative to the socket housing for rotation of the symbol image formed by the light emitting diodes to a desired rotational orientation relative to the socket housing.

2. The LED lamp as recited in claim 1, wherein the printed circuit board is rotatably mounted to the socket housing via a circuit housing disposed therebetween, where the circuit housing is mounted to the printed circuit board and rotatably attached to the socket housing, the circuit housing containing electrical circuitry that is electrically connected to the threaded base and the light emitting diodes for operation thereof.

3. The LED lamp as recited in claim 2, wherein:
the circuit housing has a lower portion that rotatably engages an upper end of the socket housing.

4. The LED lamp as recited in claim 3, further comprising:
a spring disposed to exert a bias force between the socket housing and the lower portion of the circuit housing to increase friction therebetween for selectively fixing an angular orientation between the socket housing and the circuit housing.

5. The LED lamp as recited in claim 4, wherein the socket housing includes a retainer having external threads that engage internal threads formed on the upper portion of the socket housing, and wherein the lower portion of the circuit housing is rotatably engaged with the retainer.

6. The LED lamp as recited in claim 4, further comprising:
wires that electrically connect the light emitting diodes to the electrical circuitry;
a detachable connector for removably disconnecting the wires between the light emitting diodes and the electrical circuitry; and
at least one fastener for removably mounting the printed circuit board to the circuit housing.

7. The LED lamp as recited in claim 6, wherein the fastener is a screw.

8. The LED lamp as recited in claim 4, wherein the image formed by the plurality of light emitting diodes is one of a hand, a pedestrian, an arrow, a letter and a word.

9. An LED lamp for mounting in a threaded screw-in electrical socket of a traffic signal, comprising:
a socket housing having a lower end terminating in a threaded base for insertion into a threaded screw-in electrical socket;
a printed circuit board rotatably mounted to the socket housing;
a plurality of light emitting diodes mounted on the printed circuit in such a manner that the plurality of light emitting diodes form a symbol image, wherein the printed circuit board is selectively rotatable relative to the socket housing for rotation of the symbol image formed by the light emitting diodes to a desired rotational orientation relative to the socket housing, and wherein the printed circuit board is rotatably mounted to the socket housing via a circuit housing disposed therebetween, where the circuit housing is mounted to the printed circuit board and rotatably attached to the socket housing, the circuit housing containing electrical circuitry that is electrically connected to the threaded base and the light emitting diodes for operation thereof, the circuit housing has a lower portion that rotatably engages an upper end of the socket housing;
a spring disposed to exert a bias force between the socket housing and the lower portion of the circuit housing to increase friction therebetween for selectively fixing an annular orientation between the socket housing and the circuit housing;
a pair of electrical sockets formed in one of the circuit housing and the printed circuit board, the electrical sockets are electrically connected to one of the electrical circuitry and the light emitting diodes; and
a pair of electrical plugs attached to the other of the circuit housing and the printed circuit board, the plugs are electrically connected to the other of the electrical circuitry and the light emitting diodes, wherein the pair of plugs engage the pair of sockets as the printed circuit board is mounted to the circuit housing to electrically connect the light emitting diodes to the electrical circuitry.

10. An for mounting in a threaded screw-in electrical socket of a traffic signal, comprising:
a socket housing having a lower end terminating in a threaded base for insertion into a threaded screw-in electrical socket;
a printed circuit board rotatably mounted to the socket housing;
a plurality of light emitting diodes mounted on the printed circuit in such a manner that the plurality of light emitting diodes form a symbol image, wherein the printed circuit board is selectively rotatable relative to the socket housing for rotation of the symbol image formed by the light emitting diodes to a desired rotational orientation relative to the socket housing, and wherein the printed circuit board is rotatable mounted to the socket housing via a circuit housing disposed therebetween, where the circuit housing is mounted to the printed circuit board and rotatable attached to the socket housing, the circuit housing containing electrical circuitry that is electrically connected to the threaded base and the light emitting diodes for operation thereof, the circuit housing has a lower portion that rotatably engages an upper end of the socket housing; and
a spring disposed to exert a bias force between the socket housing and the lower portion of the circuit housing to increase friction therebetween for selectively fixing an angular orientation between the socket housing and the circuit housing;
wherein a surface of the printed circuit board upon which the plurality of light emitting diodes is mounted is non-planar.

11. An LED lamp for mounting in a threaded screw-in electrical socket of a traffic signal, comprising:
a socket housing having a lower end terminating in a threaded base for insertion into a threaded screw-in electrical socket;
a printed circuit board rotatably mounted to the socket housing; and
a plurality of light emitting diodes mounted on the printed circuit in such a manner that at least some of the diodes are oriented at an oblique angle to the printed circuit board.

12. The LED lamp as recited in claim 11, wherein the plurality of light emitting diodes form a non-symmetric symbol image, and wherein the printed circuit board is selectively rotatable relative to the socket housing for rotation of the symbol image formed by the light emitting diodes to a desired rotational orientation relative to the socket housing.

13. The LED lamp as recited in claim 12, wherein the printed circuit board is rotatably mounted to the socket housing via a circuit housing disposed therebetween, where the circuit housing is mounted to the printed circuit board and rotatably attached to the socket housing, the circuit housing containing electrical circuitry that is electrically connected to the threaded base and the light emitting diodes for operation thereof.

14. The LED lamp as recited in claim 13, wherein:
the circuit housing has a lower portion that rotatably engages an upper end of the socket housing.

15. The LED lamp as recited in claim 14, further comprising:

a spring disposed to exert a bias force between the socket housing and the lower portion of the circuit housing to increase friction therebetween for selectively fixing an angular orientation between the socket housing and the circuit housing.

16. The LED lamp as recited in claim 15, wherein the socket housing includes a retainer having external threads that engage internal threads formed on the upper portion of the socket housing, and wherein the lower portion of the circuit housing is rotatably engaged with the retainer.

17. The LED lamp as recited in claim 15, further comprising:

wires that electrically connect the light emitting diodes to the electrical circuitry;

a detachable connector for removably disconnecting the wires between the light emitting diodes and the electrical circuitry; and at least one fastener for removably mounting the printed circuit board to the circuit housing.

18. The LED lamp as recited in claim 17, wherein the fastener is a screw.

19. The LED lamp as recited in claim 15, wherein the image formed by the plurality of light emitting diodes is one of a hand, a pedestrian, an arrow, a letter and a word.

20. The LED lamp as recited in claim 15, wherein a surface upon which the plurality of light emitting diodes is mounted is non-planar.

\* \* \* \* \*